US 8,165,946 B2

(12) United States Patent
Anderson (10) Patent No.: US 8,165,946 B2
(45) Date of Patent: *Apr. 24, 2012

(54) CUSTOMIZED FINANCIAL TRANSACTION PRICING

(75) Inventor: James Anderson, Cave Creek, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,390

(22) Filed: Jul. 26, 2011

(65) Prior Publication Data

US 2011/0282791 A1 Nov. 17, 2011

Related U.S. Application Data

(63) Continuation of application No. 12/264,789, filed on Nov. 4, 2008, now Pat. No. 8,010,429.

(51) Int. Cl.
*G06Q 40/00* (2006.01)
(52) U.S. Cl. ............................................ 705/35; 705/39
(58) Field of Classification Search .................... 705/35, 705/39
See application file for complete search history.

(56) References Cited

U.S. PATENT DOCUMENTS

| 6,999,943 | B1 | 2/2006 | Johnson et al. |
| 7,624,068 | B1 | 11/2009 | Heasley et al. |
| 7,627,521 | B1 | 12/2009 | Sheehan et al. |
| 2002/0095303 | A1 | 7/2002 | Asayama et al. |
| 2004/0088238 | A1 | 5/2004 | Gilson et al. |
| 2005/0027648 | A1 | 2/2005 | Knowles et al. |
| 2009/0063291 | A1 | 3/2009 | Robbins et al. |
| 2009/0234748 | A1 | 9/2009 | Skowronek et al. |

OTHER PUBLICATIONS

USPTO; Office Action dated Mar. 11, 2010 in U.S. Appl. No. 12/264,789.
USPTO; Final Office Action dated Aug. 19, 2010 in U.S. Appl. No. 12/264,789.
USPTO; Advisory Action dated Oct. 12, 2010 in U.S. Appl. No. 12/264,789.
USPTO; Office Action dated Nov. 16, 2010 in U.S. Appl. No. 12/264,789.
USPTO; Notice of Allowance dated Apr. 29, 2011 in U.S. Appl. No. 12/264,789.

*Primary Examiner* — Shahid Merchant
(74) *Attorney, Agent, or Firm* — Snell & Wilmer L.L.P.

(57) ABSTRACT

Enabling innovative merchant transaction pricing capability, while improving pricing process efficiency, is disclosed. When a merchant submits financial transaction account records to a payment processor for payment, the payment processor utilizes granular transaction data to calculate complex merchant transaction pricing rules. The system accesses individual transaction data, aggregate transaction data, transaction history, customer data, merchant data and product data to enable flexible, innovative and dynamic pricing capabilities that increase revenue and increase customer satisfaction.

21 Claims, 3 Drawing Sheets

Figure 1

Figure 2 – Transaction Processing Overview

Figure 3 – Transaction Fee Calculation

CUSTOMIZED FINANCIAL TRANSACTION PRICING

RELATED APPLICATION

This invention is a continuation of, and claims priority to, U.S. Ser. No. 12/264,789 filed on Nov. 4, 2008 and entitled "CUSTOMIZED FINANCIAL TRANSACTION PRICING".

FIELD OF THE INVENTION

The invention generally relates to improving the flexibility and efficiency for calculating transaction fees, and more particularly, to using individual transaction records and other granular data to enable enhanced pricing algorithms for calculating merchant transaction fees in financial transaction account transactions.

BACKGROUND OF THE INVENTION

The ability to offer flexible, customizable pricing is a competitive advantage in almost any industry. In the financial transaction account industry, merchants typically pay a transaction fee to payment processors and/or transaction account issuers in exchange for the ability to offer their customers the convenience of paying for purchases using a transaction account, such as a credit card. Traditionally, the transaction fee is a simple calculation of the aggregate transaction amount submitted by the merchant multiplied by a transaction fee rate (e.g. 2.5%).

Existing merchant transaction fee pricing methods typically constrain the ability of payment processors and issuers to provide innovative pricing options that encourage merchants to allow payment using a particular type of financial transaction instrument. Data and processing constraints have typically posed significant technological barriers to offering complex, customized pricing methods. Thus, a long-felt need exists to enhance the flexibility of merchant transaction fee calculations and the granularity of the data available for those calculations and to allow merchants and payment processors to negotiate innovative transaction fee pricing plans.

SUMMARY OF THE INVENTION

The present invention improves upon existing systems and methods by providing a tangible, integrated, customized and dynamic transaction fee calculation process. When a merchant submits charges for payment to a payment processor, the system saves both the summary of charges and the individual charge records in a database to enable complex merchant pricing calculations that are based upon granular, transaction specific data elements. In one embodiment, a payment processor negotiates complex transaction pricing rules with merchants. The payment processor uses granular data from individual transaction records to evaluate pricing rules that depend on product, merchant, customer and historical data. The system allows payment processors to efficiently and accurately calculate complex pricing rules and incentives, including tiered pricing and product specific volume discounts.

The enhanced system for determining merchant transaction fees uses detailed data and complex methods to provide innovate merchant transaction pricing that increases total revenue and decreases costs. In one embodiment, the system receives, from a merchant, a plurality of records of charges (ROCs) comprising a first ROC, wherein each ROC in the plurality of ROCs comprises ROC data from a financial transaction; retrieves, from a database, custom transaction fee rules associated with a merchant profile associated with the merchant; and, dynamically calculates a merchant transaction fee according to the custom transaction fee rules using first ROC data and second data.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a graphical user interface (GUI), a software module, logic engines, numerous databases and computer networks. While the system may contemplate upgrades or reconfigurations of existing processing systems, changes to existing databases and business information system tools are not necessarily required by the present invention.

The exemplary benefits provided by this invention include enhanced product flexibility, efficiency, transparency and transaction account ("TXA") spending. For TXA payment processors, benefits include, for example, the ability to provide incentives to merchants that result in increased TXA spending, enhanced customer satisfaction with a TXA instrument and reduced merchant settlement processing costs. Benefits to merchants include the ability to negotiate innovative transaction pricing plans that compliment other marketing and sales initiatives.

While described in the context of systems and methods that enable enhanced flexibility and efficiency for TXA transaction fee pricing calculations, practitioners will appreciate that the present invention may be similarly used to enhance functionality, improve customer satisfaction and increase efficiency in the context of providing enhanced, transaction-based pricing capabilities for other industries. Other embodiments of such enhanced pricing techniques may be accomplished through a variety of computing resources and hardware infrastructures.

While the description makes reference to specific technologies, system architectures and data management techniques, practitioners will appreciate that this description is but one embodiment and that other devices and/or methods may be implemented without departing from the scope of the invention. Similarly, while the description makes reference to a web client, practitioners will appreciate that other examples of transaction-based pricing functions may be accomplished by using a variety of user interfaces including personal computers, kiosks, handheld devices such as personal digital assistants and cellular telephones.

"Entity" may include any individual, consumer, customer, group, business, organization, government entity, transaction account issuer or processor (e.g., credit, charge, etc), merchant, consortium of merchants, account holder, charitable organization, software, hardware, and/or any other entity.

An "account", "account number" or "customer account" as used herein, may include any device, code (e.g., one or more of an authorization/access code, personal identification number ("PIN"), user profile, demographic, Internet code, other identification code, and/or the like), number, letter, symbol, digital certificate, smart chip, digital signal, analog signal, biometric or other identifier/indicia suitably configured to allow the consumer to access, interact with, be identified by or communicate with the system. The account number may optionally be located on or associated with a rewards card, charge card, credit card, debit card, prepaid card, telephone card, secure hardware area or software element associated with a phone or mobile device, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, the system may include any device having a transponder which is configured to communicate with an RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account number may be, for example, any number or alpha-numeric characters that identify a particular merchant for purposes of card acceptance, account reconciliation, reporting, or the like.

A "transaction account" ("TXA") includes any account that may be used to facilitate a transaction, e.g. financial, loyalty points, rewards program, access, exchange, etc. A "TXA issuer" includes any entity that offers TXA services to customers.

A "TXA issuer" may include any entity which processes transactions, issues accounts, acquires financial information, settles accounts, conducts dispute resolution regarding accounts, and/or the like.

A "customer" includes any entity that has a TXA with a TXA issuer.

A "merchant" includes any entity that accepts a TXA account for payment and/or seeks payment, pays or settles financial transactions with a TXA issuer.

"TXA identification data" ("TXA-ID") includes data used to identify, coordinate, verify or authorize a customer. The TXA-ID may also provide unique identification, validation and/or unique authorization. The TXA-ID may include, for example, a code, authorization code, validation code, access code, a transaction account identification number, demographic data, encryption key, proxy account number, PIN, Internet code, card identification number (CID), number, letter, symbol, digital certificate, smart chip, digital signal, analog signal, RFID, biometric or other identifier/indicia suitably configured to uniquely identify a customer and associated TXA and/or to authorize a transaction to a TXA. A CID number is used in many credit or charge card transaction accounts. For further information regarding CIDs see, for example: Systems and Methods for Authorizing a Transaction Card, U.S. Pat. No. 6,182,894 issued on Feb. 5, 2001; and System and Method for Facilitating a Financial Transaction with a Dynamically Generated Identifier, U.S. Ser. No. 11/847,088 filed on Aug. 29, 2007, both of which are hereby incorporated by reference.

Figure 1:
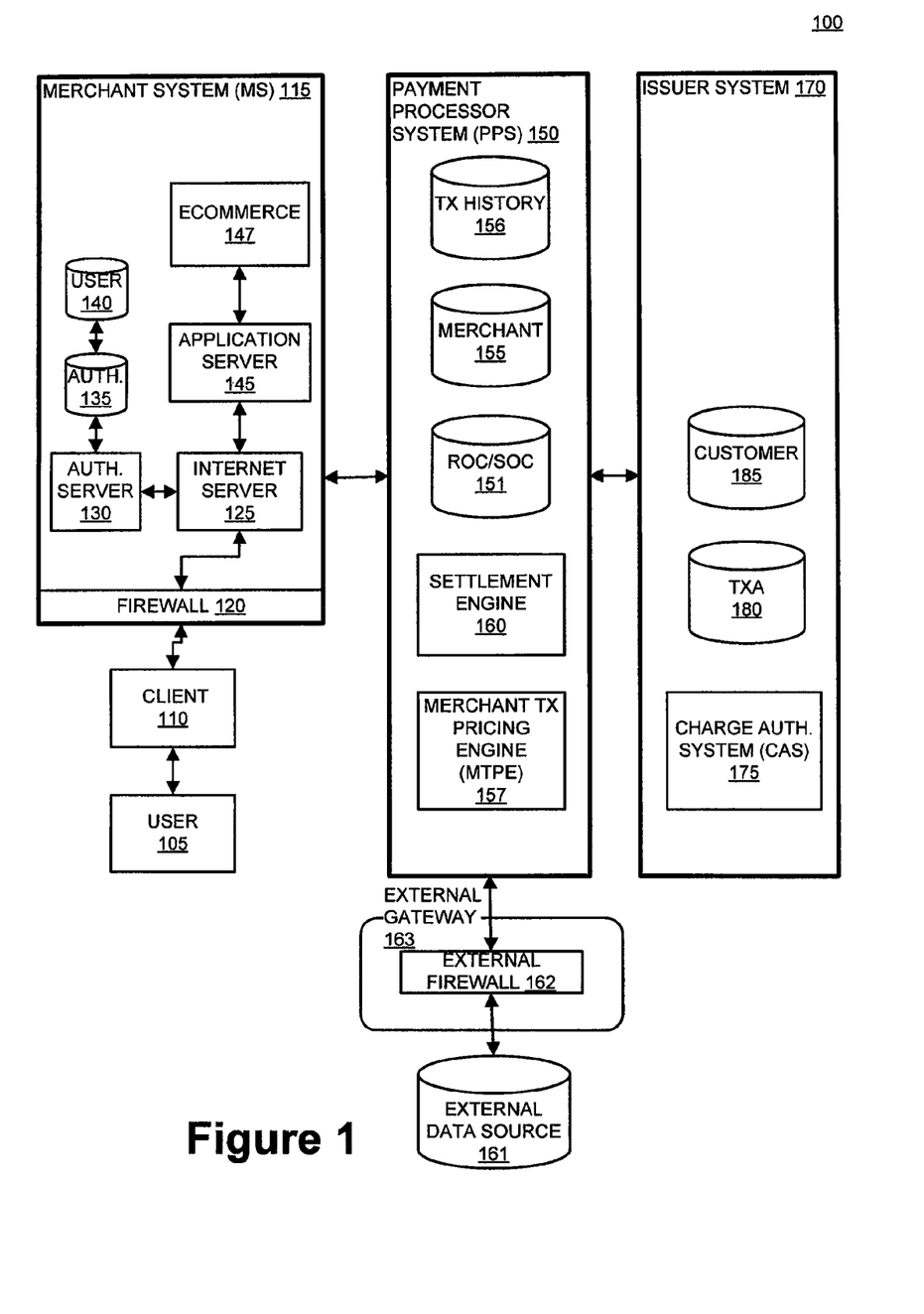
FIG. 1 is an overview of a representative system for providing transaction based pricing capabilities to a payment processor, in accordance with one embodiment of the present invention.

A "user" may include any individual or entity that interacts with a system or participates in a process. With reference to FIG. 1, user 105 may perform tasks such as requesting, retrieving, receiving, updating, analyzing, entering and/or modifying data. User 105 may be, for example, a consumer purchasing items from a merchant's online e-commerce site. User 105 may interface with Internet server 125 via any communication protocol, device or method discussed herein, known in the art, or later developed. In one embodiment, user 105 may interact with MS 115 via an Internet browser at a web client 110.

In one embodiment, with reference to FIG. 1, the system includes a user 105 interfacing with a merchant system ("MS") 115 by way of a web client 110. Web client 110 comprises any hardware and/or software suitably configured to facilitate requesting, retrieving, updating, analyzing, entering and/or modifying data. The data may include verification data, authentication data, service enrollment data or any information discussed herein. Web client 110 includes any device (e.g., personal computer), which communicates (in any manner discussed herein) with the MS 115 via any network discussed herein. Such browser applications comprise Internet browsing software installed within a computing unit or system to conduct online transactions and communications. These computing units or systems may take the form of personal computers, mobile phones, personal digital assistants, mobile email devices, laptops, notebooks, hand held computers, portable computers, kiosks, and/or the like. Practitioners will appreciate that the web client 110 may or may not be in direct contact with the MS 115. For example, the web client 110 may access the services of the MS 115 through another server, which may have a direct or indirect connection to Internet server 125.

The invention contemplates uses in association with e-commerce, TXA services, customer service systems, customer portals, billing payment management systems, pervasive and individualized solutions, open source, biometrics, mobility and wireless solutions, commodity computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The user 105 may communicate with the MS 115 through a firewall 120 to help ensure the integrity of the MS 115 components. Internet server 125 may include any hardware and/or software suitably configured to facilitate communications between the web client 110 and one or more MS 115 components.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the authentication database 135 and the user database 140.

Application server 145 may include any hardware and/or software suitably configured to serve applications and data to a connected web client 110. The e-commerce engine ("ECE") 147 is configured to perform e-commerce functions such as selecting (or receiving selections of) items for purchase, and/or submitting purchase requests including billing and shipping information. These functions include, for example, submitting customer TXA information to payment processor system ("PPS") 150, prompting user 105 with security challenges, verifying user responses, authenticating the user, initiating a service enrollment process, initiating other business modules, encrypting and decrypting. Additionally, ECE 147 may include any hardware and/or software suitably configured to receive requests from the web client 110 via Internet server 125 and the application server 145. ECE 147 is further configured to process requests, execute transactions, construct database queries, and/or execute queries against databases within system 100, external data sources and temporary databases, as well as exchange data with other application modules (not pictured). In one embodiment, the ECE 147 may be configured to interact with other system 100 components to perform complex calculations, retrieve additional data, format data into reports, create XML representations of data, construct markup language documents, and/or the like. Moreover, the ECE 147 may reside as a standalone system or may be incorporated with the application server 145 or any other MS 115 component as program code.

Payment processor system ("PPS") 150 represents systems employed by transaction card companies like American Express® and other card acquirers or card issuers to authorize merchant transaction requests, process settlement requests and/or handle dispute resolution.

Merchant transaction pricing engine ("MTPE") 155 calculates transaction fees according to, for example, pricing plans, and transaction, merchant, customer, product and historical data.

Settlement engine 160 coordinates the settlement process whereby the merchant receives payment for authorized transactions to a TXA held by a TXA issuer.

ROC/SOC database 151 includes completed transaction data received from MS 115. Upon completing a transaction with user 105, a record of charges (ROC) is generally created by MS 115. The ROC file generally contains transaction details which may include TXA-ID, merchant identification number, amount of purchase, date of purchase, and expiration date. Generally, after a given period of time (e.g., at the end of the day), the MS 115 summarizes the transactions for that period in a summary of charges (SOC) and submits the ROCs and SOC to PPS 150 for payment.

Merchant database 155 includes contractual and demographic information regarding merchants. In one embodiment, merchant database 155 includes the pricing rules that govern how, when and what data to use when pricing merchant transaction fees.

TX history database 156 includes historical transaction data that may be useful in performing complex merchant transaction fee calculations. For instance, TX history database may store a running total of the number or transaction amount submitted by a merchant for a particular TXA account type.

Issuer system 170 coordinates; authorizes and executes charges to TXAs and coordinates the merchant settlement process with PPS 150.

Charge Authorization System (CAS) 175 includes systems for comparing transaction request details (e.g., account number, monetary amount of transaction, expiration date, etc.) with user's 105 TXA information which is stored in TXA 180, to determine, for example, if the TXA is active and if a sufficient credit limit exists to complete a transaction. Typically, when CAS 175 approves a transaction request, it returns an approval code to PPS 150.

Customer database 185 includes customer (i.e. users 105 who own a TXA issued by a TXA issuer) contractual and demographic data.

MS 115, PPS 150 and/or issuer system 170 may be interconnected via a payment network (not depicted in FIG. 1). The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

FIG. 1 depicts databases that are included in an exemplary embodiment of the invention. A exemplary list of various databases used herein includes: an authentication database 135, a user database 140, a ROC/SOC database 151, a merchant database 155, a TX history database 156, a TXA database 180, a customer database 185, an external data source 161 and/or other databases that aid in the functioning of the system. As practitioners will appreciate, while depicted as separate and/or independent entities for the purposes of illustration, databases residing within system 100 may represent multiple hardware, software, database, data structure and networking components.

Authentication database 135 may store information used in the authentication process such as, for example, user identifiers, passwords, access privileges, user preferences, user statistics, and the like. The user database 140 maintains user information and credentials for MS 115 users. As practitioners will appreciate, embodiments are not limited to the exemplary databases described above, nor do embodiments necessarily utilize each of the disclosed exemplary databases. The customer database 185 stores profile, demographic and other information for a customer such as, for example, customized security challenges and responses, customer demographic information, authorized merchant information, rewards program information and any other information that enables making charges to a TXA.

In addition to the components described above, system 100, MS 115, PPS 150 and issuer system 170 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 100 components may be embodied as a customization of an existing system, an add-on product, upgraded software, a stand-alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Web client 110 may include an operating system (e.g., Windows Mobile OS, Windows CE, Palm OS, Symbian OS, Blackberry OS, J2ME, Window XP, Windows NT, 95/98/2000, XP, Vista, OS2, UNIX, Linux, Solaris, MacOS, etc.) as well as various conventional support software and drivers typically associated with mobile devices and/or computers. Web client 110 may be in any environment with access to any network, including both wireless and wired network connections. In an embodiment, access is through a network or the Internet through a commercially available web-browser software package. Web client 110 may be independently, separately or collectively suitably coupled to the network via data links which includes, for example, a connection to an Internet Service Provider (ISP) over the local loop as is typically used in connection with standard wireless communications networks and/or methods, modem communication, cable modem, Dish networks, ISDN, Digital Subscriber Line (DSL), see, e.g., Gilbert Held, Understanding Data Communications (1996), which is hereby incorporated by reference. In another embodiment, any portion of web client 110 is partially or fully connected to a network using a wired ("hard wire") connection. As those skilled in the art will appreciate, web client 110 and/or any of the system components may include wired and/or wireless portions.

Firewall 120, as used herein, may comprise any hardware and/or software suitably configured to protect the MS 115 components from users of other networks. Firewall 120 may reside in varying configurations including stateful inspection, proxy based and packet filtering, among others. Firewall 120 may be integrated as software within Internet server 125, any other system components, or may reside within another computing device or may take the form of a standalone hardware component.

Internet server 125 may be configured to transmit data to the web client 110 within markup language documents. As used herein, "data" may include encompassing information such as commands, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Like Internet server 125, application server 145 may communicate with any number of other servers, databases and/or components through any means known in the art. Further, application server 145 may serve as a conduit between the web client 110 and the various systems and components of the MS 115. Internet server 125 may interface with application server 145 through any means known in the art including a LAN/WAN, for example. Application server 145 may further invoke software modules such as the ECE 147 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an interne protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second parties. Each of the three data sets in this example may contain different information that is stored using different data storage formats and/or techniques. Further, each data set may contain subsets of data that also may be distinct from other subsets.

As stated above, in various embodiments of system 100, the data can be stored without regard to a common format. However, in one embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier, TXA-ID or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The system 100 may be interconnected to an external data source 161 (for example, to obtain data from a vendor) via a second network, referred to as the external gateway 163. The external gateway 163 may include any hardware and/or software suitably configured to facilitate communications and/or process transactions between the system 100 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside PPS 150, the external data source 161 or any other known configuration. External gateway 163 may be configured to deliver data directly to system 100 components (such as ECE 147) and to interact with other systems and components such as PPS 150 databases. In one embodiment, the external gateway 163 may comprise web services that are invoked to exchange data between the various disclosed systems. The external gateway 163 represents existing proprietary networks that presently accommodate data exchange for data such as financial transactions, customer demographics, billing transactions and the like. The external gateway 163 is a closed network that is assumed to be secure from eavesdroppers.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIGS. 2-3 may be executed in any order and are not limited to the order presented. It will be appreciated that the following description makes appropriate references not only to the steps depicted in FIGS. 2-3, but also to the various system components as described above with reference to FIG. 1.

With reference to FIG. 1, in one embodiment, when user 105 logs onto an application, Internet server 125 may invoke an application server 145. Application server 145 invokes logic in the ECE 147 by passing parameters relating to the user's 105 requests for data. The MS 115 manages requests for data from the ECE 147 and communicates with system 100 components. Transmissions between the user 105 and the Internet server 125 may pass through a firewall 120 to help ensure the integrity of the MS 115 components. Practitioners will appreciate that the invention may incorporate any number of security schemes or none at all. In one embodiment, the Internet server 125 receives page requests from the web client 110 and interacts with various other system 100 components to perform tasks related to requests from the web client 110.

Internet server 125 may invoke an authentication server 130 to verify the identity of user 105 and assign specific access rights to user 105. In order to control access to the application server 145 or any other component of the MS 115, Internet server 125 may invoke an authentication server 130 in response to user 105 submissions of authentication credentials received at Internet server 125. When a request to access system 100 is received from Internet server 125, Internet server 125 determines if authentication is required and transmits a prompt to the web client 110. User 105 enters authentication data at the web client 110, which transmits the authentication data to Internet server 125. Internet server 125 passes the authentication data to authentication server which queries the user database 140 for corresponding credentials. When user 105 is authenticated, user 105 may access various applications and their corresponding data sources.

Figure 2:
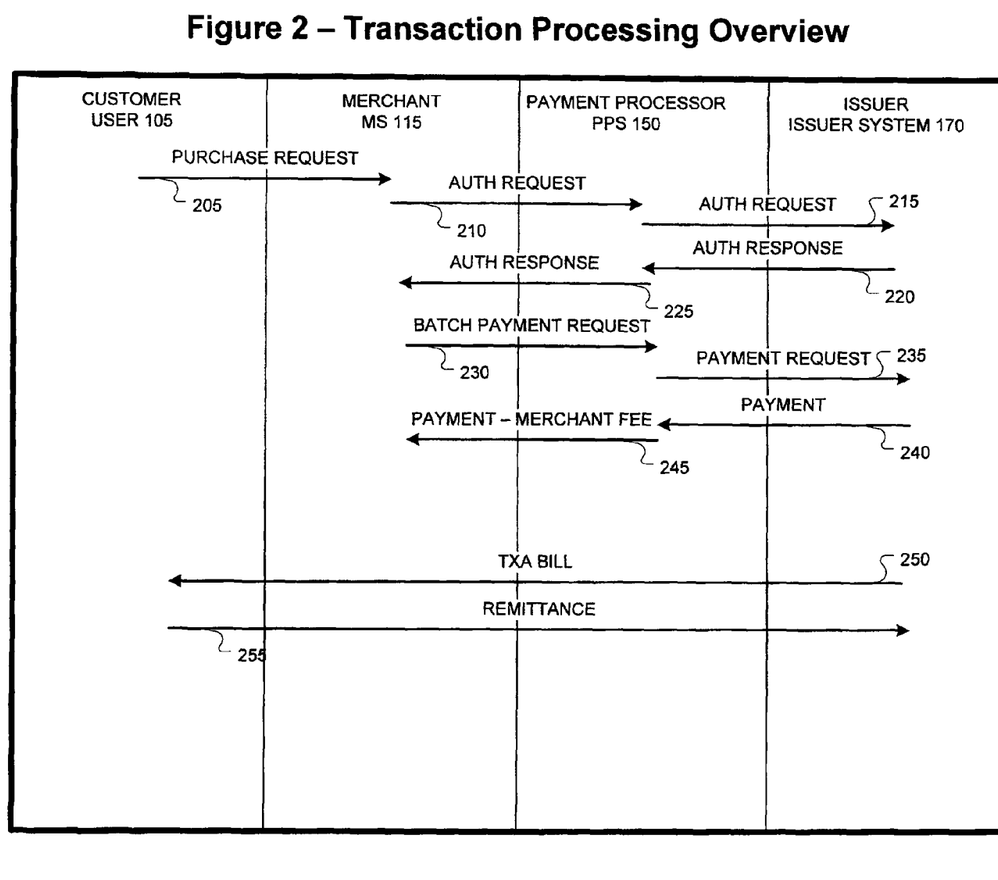
FIG. 2 is a representative process overview diagram for transaction account processing, in accordance with one embodiment of the present invention.

Referring now to FIG. 2, a broad process overview for processing a transaction using a TXA is shown. User 105 wishes to purchase an item and submits a purchase request to MS 115 designating a TXA for payment (Step 205). MS 115 sends an authorization request with the TXA-ID and the purchase amount to PPS 150 (Step 210). PPS 150 passes the authorization request to issuer system 170 and CAS 175 processes the request and provides a response (Step 215). In one embodiment, the response includes an authorization code. Issuer system 170 passes the authorization response to PPS 150 (Step 220) and PPS 150 passes the response to MS 115 (Step 225). In one embodiment, MS 115 provides a record of charges (ROC) and a summary of charges (SOC) for financial transactions for which the merchant expects payment (Step 230).

The ROC and SOC data is grouped in various formats depending upon the merchant system, payment processor requirements, etc. Such groupings include groupings by: date, customer, issuer, transaction amount, product, TXA type, etc. PPS 150 processes ROC and SOC files received from a merchant and submits a payment request to issuer system 170 (Step 235). Although depicted as a single issuer system in FIG. 2 for ease of illustration, the present invention is not limited to a single issuer system. In one embodiment, the ROC and SOC data received by PPS 150 represent requests by the merchant, via MS 115, for reimbursement for numerous TXAs which each may be issued by a different TXA issuer. Hence, the ROC and SOC files are processed by PPS 150 to determine which transactions to submit to which issuer system.

Issuer system 170 processes the payment request from PPS 150 and provides payment to PPS 150 (Step 240). PPS 150 calculates a merchant transaction fee and extracts the merchant transaction fee from the payment it sends to MS 115 (Step 245). As discussed in more detail below, the merchant transaction fee may be calculated according to a variety of methods. The issuer system aggregates the charges for a TXA for a particular time period, typically a month in duration, and sends a TXA payment bill to the customer (user 105) (Step 250). User 105 remits payment to issuer system 170 (Step 255).

Figure 3:
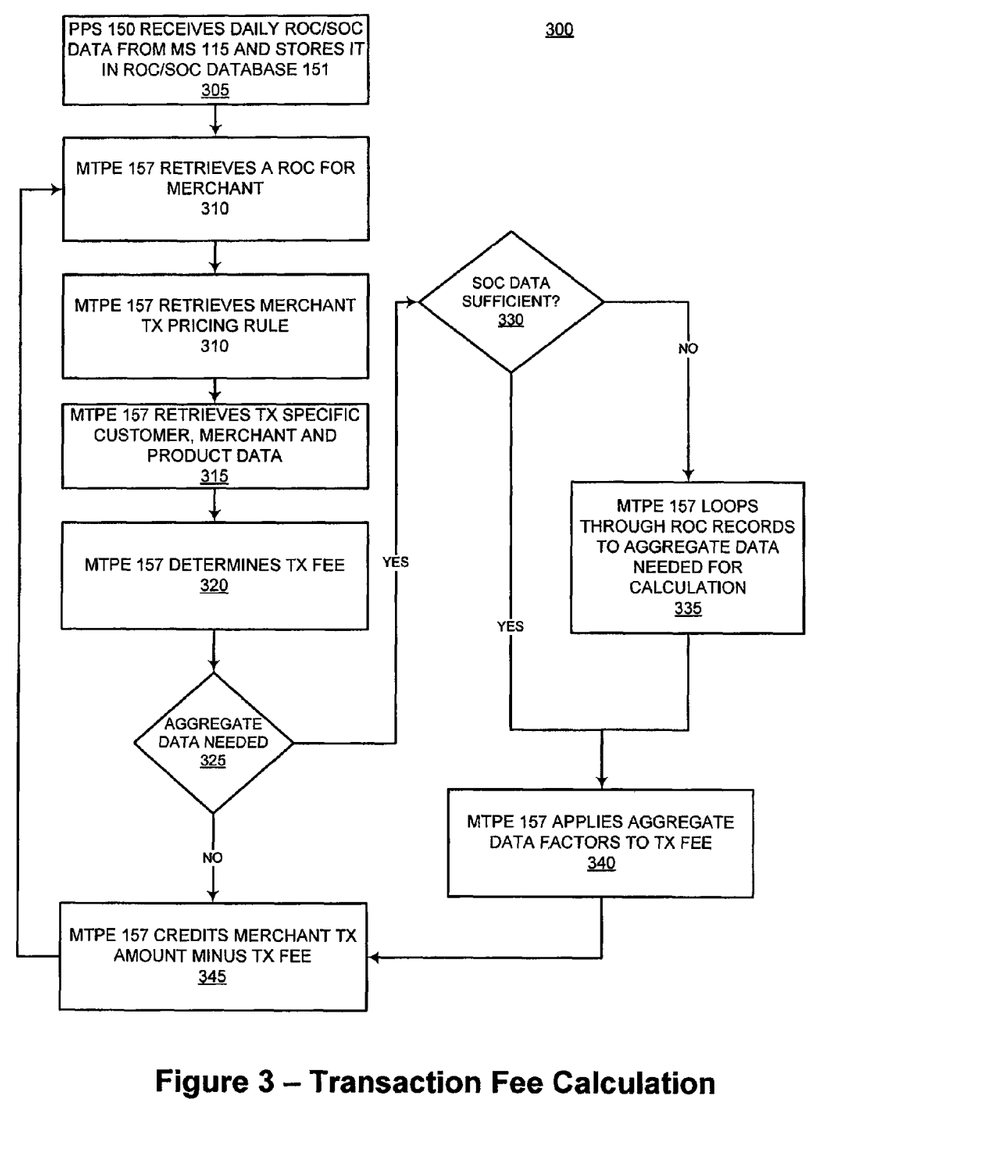
FIG. 3 is a representative process overview diagram for calculating merchant transaction fees based upon transaction specific data, in accordance with one embodiment of the present invention.

FIG. 3 shows a representative process for determining the transaction fee a payment processor charges a merchant. PPS 150 dynamically determines the merchant transaction fee in a variety of methods and using a variety of ROC, SOC, historical, merchant, product, demographic and contractual data. PPS 150 receives SOC and ROC data from MS 115 on a periodic basis (e.g. daily) (Step 305). MTPE 157 retrieves the appropriate pricing rule for the transaction. In one embodiment, the pricing rule is stored in merchant database 155 at the merchant level. In another example, the pricing rule is stored according to the merchant type or issuer level. MTPE 157 retrieves and correlates the transaction specific ROC granular data with other data accessible by PPS 150 in order to calculate the merchant transaction fee (Step 315). The ROC granular data includes a merchant identification code, product identifier, TXA-ID, transaction amount, date, time and location of the transaction, etc. MTPE 157 accesses merchant database 155 to determine demographic data regarding the merchant. MTPE 157 accesses TX history database 156 to retrieve information regarding a customer that is a factor in the pricing calculation (Step 315).

MTPE 157 determines the transaction fee (Step 320) or an adjustment to the transaction fee (e.g., increase, decrease, future change, etc). For instance, one type of merchant transaction fee is structured to reward merchants for attracting new user's 105 that pay for purchases using a TXA and the merchant transaction fee is adjusted for the first three transactions submitted for a user 105 that is new for the merchant. Similarly, a merchant transaction fee is structured, in some embodiments, to reward the merchant for attracting a gold card, high (or low) TXA balance or new TXA customer. In one embodiment, merchants receive an adjusted transaction fee for customers that live in close proximity to the merchant location or for customers that use (or do not use) loyalty points during the transaction. The transaction fee may be adjusted for the current transaction, a past transaction or a future transaction based on any factor, attribute or data such as, for example, consumer data, merchant data, location data, product data, transaction data, historical data, current data, projected data, aggregate data, random data, trend data, economic data, third party data and/or the like (or any portion thereof).

In one embodiment, data stored in PPS 150 (e.g. ROC/SOC database 151 and TX history database 156 lacks the detail regarding a customer to determine the merchant transaction fee. Thus, PPS 150 retrieves data from issuer system 170 (e.g. customer database 185) or external data source 161 (e.g. vendor data), and uses the data in complex merchant transaction pricing rules. For instance, the product identifier is provided in the ROC and stored in ROC/SOC database 151 and a transaction pricing rule, stored in merchant database 155, depends on the product category. MTPE 157 accesses product data supplied by an external vendor to determine the product category corresponding to the product identifier and applies the proper pricing calculation based upon that product category.

MTPE 157 determines if aggregate transaction data should be accessed to complete the merchant transaction fee calculation (Step 325). For example, the rule for applying volume discounts and tiered pricing plans may include information regarding not only the transaction being priced but also aggregate or summary information regarding other transactions. In one embodiment, a volume discount applies a discount to the merchant transaction fee if the aggregate total of some set of transactions exceeds a threshold, and tiered pricing applies a different transaction fee (calculated as a percent of the transaction amount) depending on the aggregate transaction amount for a specific set of transactions. In one embodiment, merchant type is a determinant of the merchant transaction fee (e.g. merchants that sell home improvement products receive a discount on their transaction fee). In one embodiment, the merchant transaction fee is determined by a specific contractual arrangement between the payment processor and the merchant. MTPE 157 accesses the contractual rules from merchant database 155 and uses other data to calculate the rules. For instance, in one embodiment, the merchant receives a volume discount once they achieve a total of $100,000 in total transactions. In another example, a volume discount is applied when a merchant achieves a total of $100,000 in transactions excluding transactions for "gold card" TXAs and transactions for food related products.

In one embodiment, the merchant transaction fee is dependant upon the detail of a transaction and upon aggregate transaction characteristics. The merchant receives either a reduced transaction fee (e.g. transaction fee discount) on a transaction by transaction basis for the transactions occurring before noon of any given day; or, the merchant is also eligible for a volume discount if the average transaction amount during the day is greater than fifty dollars. MTPE 157 uses both the ROC (Step 335) and SOC data (Step 325) submitted by the merchant for that day to perform calculations for both rules and to determine the appropriate merchant transaction fee to charge the merchant (Step 340). MTPE 157 credits the merchant account with the transaction amount and debits the account in the amount of the merchant transaction fee. MTPE saves the calculated merchant transaction fee in TX history database 156 and continues processing ROC records. In one embodiment, MTPE 157 saves the data and calculation steps used in calculating the merchant transaction fee in the TX history database 156 to provide audit-ability and transparency to the merchant transaction fee pricing process.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method, comprising:
    determining, by a computer for calculating a merchant transaction fee and based upon custom transaction fee rules, that a summary of charges (SOC) provides insufficient detail to determine the merchant transaction fee based on the SOC;
    in response to the determining that the SOC provides insufficient detail, determining first data by at least one of:
    acquiring, by the computer, a customer identifier (ID) from a transaction account database using a transaction account identifier (TXA-ID);
    correlating, by the computer, the customer ID with at least one of a customer profile, a customer type, a customer transaction history, and a customer location to determine a customer factor, wherein the first data comprises the customer factor;
    acquiring, by the computer, a merchant profile based upon a merchant identifier (ID) from a merchant database;
    correlating, by the computer, the merchant profile with at least one of a merchant type, a merchant transaction history and a merchant location, to determine a merchant factor, wherein the first data comprises the merchant factor;
    acquiring, by the computer, product data associated with a product ID from a product database;
    correlating, by the computer, the product data with at least one of a product type, a product transaction history, a product-customer demographic and a product price, to determine a product factor, wherein the first data comprises the product factor; and
    calculating, by the computer and in response to the determining the first data, the merchant transaction fee according to the custom transaction fee rules using first receipt of charge (ROC) data, the SOC and the first data, wherein the ROC data is obtained from a ROC database.

2. The method of claim 1, wherein the custom transaction fee rules are associated with a merchant profile associated with the merchant.

3. The method of claim 1, wherein the first data is at least one of the merchant, a customer, a customer type, a transaction account type, a merchant location, a product type, a transaction amount, a customer relationship to the merchant, a customer location relative to the merchant location, a customer transaction history, a merchant volume discount, a merchant tiered pricing plan, a time of day, a day of the month, and a time of year.

4. The method of claim 1, wherein the first data is associated with at least one of the merchant, a consumer, a location, a product, the financial transaction, historical data, current data, projected data, aggregate data, random data, trend data, economic data and third party data.

5. The method of claim 1, wherein a first ROC is associated with the SOC and includes the first ROC data.

6. The method of claim 5, wherein a plurality of records of charges (ROCs) comprise the first ROC, wherein each ROC in the plurality of ROCs comprises ROC data from a financial transaction.

7. The method of claim 1, wherein the first ROC data comprises at least one of a transaction authorization code, a TXA-ID, a transaction date, a transaction amount, a transaction time, a merchant ID, and a product ID.

8. The method of claim 1, further comprising:
acquiring eligible transaction amounts associated with the TXA-ID from a transaction history database;
aggregating the eligible transaction amounts into a total eligible amount;
determining a volume discount based upon the total eligible amount and a volume discount threshold; and,
applying the volume discount to the merchant transaction fee.

9. The method of claim 8, wherein the total eligible amount is based upon at least one of a customer factor, a merchant factor and a product factor.

10. The method of claim 1, wherein the first data comprises a location factor determined by the proximity of a merchant address and a customer address.

11. The method of claim 10, further comprising:
acquiring the customer address from a customer database using the TXA-ID; and,
acquiring the merchant address from a merchant database using the merchant ID.

12. The method of claim 1, further comprising acquiring a transaction account type associated with the TXA-ID, wherein the first data comprises the transaction account type.

13. The method of claim 1, further comprising acquiring a customer-merchant transaction count from a transaction history database, wherein the customer-merchant transaction count is associated with the TXA-ID and the merchant ID, and wherein the first data comprises the customer-merchant transaction count.

14. The method of claim 1, further comprising acquiring a merchant-product transaction count from a transaction history database, wherein the merchant-product transaction count is associated with the merchant ID and the product ID, and wherein the first data comprises the merchant-product transaction count.

15. The method of claim 1, further comprising:
receiving, from the merchant, an authorization request to authorize a charge to a transaction account identified by a transaction account identifier (TXA-ID);
submitting the authorization request to a transaction account issuer;
receiving an authorization response comprising an authorization code from the transaction account issuer;
transmitting the authorization code to the merchant.

16. The method of claim 15, further comprising:
receiving an aggregate payment request from the merchant;
submitting the aggregate payment request to the transaction account issuer; and,
receiving payment associated with the aggregate payment request from the transaction account issuer.

17. The method of claim 1, further comprising configuring the merchant profile with custom transaction pricing rules.

18. The method of claim 1, further comprising:
receiving a merchant aggregate payment request from a merchant, wherein the merchant aggregate payment request comprises data from at least a subset of the plurality of ROCs;
calculating a merchant aggregate transaction fee from the merchant aggregate payment request;
calculating a merchant individual transaction fee for each of the ROCs based upon the custom transaction fee rules; and determining a final merchant transaction fee as the lesser of the merchant aggregate transaction fee and the sum of the merchant individual transaction fees.

19. The method of claim 1, further comprising:
subtracting the merchant transaction fee from an issuer reimbursement payment received from a transaction account issuer to create a reduced merchant payment; and,
sending the reduced merchant payment to at least one of the merchant and a merchant financial account.

20. A non-transitory computer-readable medium having computer-executable instructions stored thereon that, if executed by a computer for calculating a merchant transaction fee, cause the computer to perform operations comprising:
determining, by the computer and based upon custom transaction fee rules, that a summary of charges (SOC) provides insufficient detail to determine the merchant transaction fee based on the SOC;
in response to the determining that the SOC provides insufficient detail, determining first data by at least one of:
acquiring, by the computer, a customer identifier (ID) from a transaction account database using a transaction account identifier (TXA-ID);
correlating, by the computer, the customer ID with at least one of a customer profile, a customer type, a customer transaction history, and a customer location to determine a customer factor, wherein the first data comprises the customer factor;
acquiring, by the computer, a merchant profile based upon a merchant identifier (ID) from a merchant database;
correlating, by the computer, the merchant profile with at least one of a merchant type, a merchant transaction history and a merchant location, to determine a merchant factor, wherein the first data comprises the merchant factor;
acquiring, by the computer, product data associated with a product ID from a product database;
correlating, by the computer, the product data with at least one of a product type, a product transaction history, a product-customer demographic and a product price, to determine a product factor, wherein the first data comprises the product factor; and
calculating, by the computer and in response to the determining the first data, the merchant transaction fee according to the custom transaction fee rules using first receipt of charge (ROC) data, the SOC and the first data, wherein the ROC data is obtained from a ROC database.

21. A system comprising:
a network interface communicating with a memory;
the memory communicating with a processor for calculating a merchant transaction fee; and
the processor, when executing a computer program, performs operations comprising:
determining, by the processor and based upon custom transaction fee rules, that a summary of charges (SOC) provides insufficient detail to determine the merchant transaction fee based on the SOC;
in response to the determining that the SOC provides insufficient detail, determining first data by at least one of:
acquiring, by the processor, a customer identifier (ID) from a transaction account database using a transaction account identifier (TXA-ID);
correlating, by the processor, the customer ID with at least one of a customer profile, a customer type, a customer transaction history, and a customer location to determine a customer factor, wherein the first data comprises the customer factor;

acquiring, by the processor, a merchant profile based upon a merchant identifier (ID) from a merchant database;

correlating, by the processor, the merchant profile with at least one of a merchant type, a merchant transaction history and a merchant location, to determine a merchant factor, wherein the first data comprises the merchant factor;

acquiring, by the processor, product data associated with a product ID from a product database;

correlating, by the processor, the product data with at least one of a product type, a product transaction history, a product-customer demographic and a product price, to determine a product factor, wherein the first data comprises the product factor; and calculating, by the processor and in response to the determining the first data, the merchant transaction fee according to the custom transaction fee rules using first receipt of charge (ROC) data, the SOC and the first data, wherein the ROC data is obtained from a ROC database.

* * * * *